US006901584B2

(12) United States Patent
Shann (10) Patent No.: US 6,901,584 B2
(45) Date of Patent: May 31, 2005

(54) ASSEMBLING AN OBJECT CODE MODULE (75) Inventor: Richard Shann, Mathern Chepstow (GB)

(73) Assignee: STMicroelectronics Limited, Almondsbury Bristol (GB)

( * ) Notice: Subject to any disclaimer, the term of this patent is extended or adjusted under 35 U.S.C. 154(b) by 446 days.

(21) Appl. No.: 09/997,230

(22) Filed: Nov. 29, 2001

(65) Prior Publication Data

US 2002/0138824 A1 Sep. 26, 2002

(30) Foreign Application Priority Data

Nov. 29, 2000 (GB) .............................................. 0029115

(51) Int. Cl.$^7$ ................................................. G06F 9/45
(52) U.S. Cl. ........................ 717/140; 717/136; 717/139; 717/159; 717/162
(58) Field of Search ................................ 717/136–141, 717/159, 161–162, 100, 163; 707/205; 714/35

(56) References Cited

U.S. PATENT DOCUMENTS

| | | | | |
|---|---|---|---|---|
| 5,193,180 A | * | 3/1993 | Hastings | 717/163 |
| 5,335,344 A | * | 8/1994 | Hastings | 714/35 |
| 5,355,475 A | * | 10/1994 | Tanaka et al. | 707/205 |
| 5,504,901 A | * | 4/1996 | Peterson | 717/144 |
| 5,642,514 A | | 6/1997 | Peckham | |
| 5,764,987 A | * | 6/1998 | Eidt et al. | 717/100 |
| 6,021,275 A | * | 2/2000 | Horwat | 717/159 |
| 6,219,830 B1 | * | 4/2001 | Eidt et al. | 717/139 |
| 6,618,824 B1 | * | 9/2003 | Hastings | 714/35 |
| 6,684,394 B1 | * | 1/2004 | Shann | 717/162 |
| 6,715,142 B1 | * | 3/2004 | Saito et al. | 717/159 |
| 6,704,928 B1 | * | 10/2004 | Shann | 717/162 |
| 6,802,060 B1 | * | 10/2004 | Shann | 717/162 |

FOREIGN PATENT DOCUMENTS

WO    WO 94/22078 A2    9/1994

OTHER PUBLICATIONS

TITLE: Data Relocation and Prefetching for Programs with Large Data Sets, author: Yamada et al, ACM, 1994.*
TITLE: Relocating Machine Instructions by Currying, author: Ramsey, ACM, 1996.*
TITLE: Relocating Machine Instructions by Currying, author: Ramsey, ACM, 1996.*

* cited by examiner

Primary Examiner—Chameli C. Das
(74) Attorney, Agent, or Firm—Lisa K. Jorgenson; James H. Morris; Wolf, Greenfield & Sacks, P.C.

(57) ABSTRACT

A method of assembling a source code module to form an object code module, said source code module including one or more assembler directives, wherein the assembler directives are used to generate relocation instructions in the object code module, the method comprising: reading a plurality of compound relocation sequence definitions stored in a memory, each compound relocation definition sequence comprising a compound relocation indicator and a first sequence of relocation instructions; reading assembler source code from said source code module, said source code generating an associated sequence of relocation instructions for executing the directive; determining if said associated sequence of relocations matches one of said stored sequence of relocation instructions; and if a match of relocation sequences is determined, inserting into said object code module a compound relocation including the compound relocation indicator of said matched compound relocation sequence definition instruction and said matched sequence.

15 Claims, 6 Drawing Sheets

ASSEMBLING AN OBJECT CODE MODULE

FIELD OF THE INVENTION

The present invention relates to assembling an object code module ready for linking.

BACKGROUND TO THE INVENTION

Linkers for producing executable programs are known. Generally speaking, a linker acts to link a number of object code modules to form a single executable program. Object code modules are usually generated from program source code modules, these modules being written a high level language. An assembler/compiler reads each source code module and assembles and/or compiles the high level language of the source code module to produce an object code module. The assembler also generates a number of relocations that are used to combine the object code module at link time in a linker.

The ELF (executable linking format) standard defines a convention for naming relocation sections belonging to a given section, e.g. rel.abc is the relocation section of section .abc. Standard relocations under the ELF format allow an offset in section data to be defined where patching is to occur and a symbol whose value is to be patched. A type field also exists which is used to describe the appropriate method of encoding the value of the symbol into the instruction or data of the section data being patched. According to the existing arrangements, the relocation type definitions are usually created on an ad hoc basis for each instruction set targeted. The 32-bit ELF standard allows only 256 distinct relocation types, so that some types are re-ascribed to different semantics for each instruction set.

One problem that exists with existing linking techniques is that the object code module itself needs to define the necessary relocations to implement the calculations required to patch a single location for each such location in the section data in the module. For sections requiring a plurality of relocation operations, object code modules can become bloated. Moreover, it is frequently the case that the same sequence of relocation operations may be required to be implemented on different sets of section data.

According to existing techniques, it is necessary to redefine the sequence of relocations in each relocation section associated with a particular set of section data.

According to UK Patent Application no. 9925849.3 filed on 1, Nov. 1999 by the present applicant further relocation types, referred to as 'special' or 'non-bit' relocations, may be implemented, including a mechanism for defining and passing compound relocations in object files. A compound relocation is a relocation that is expanded by the linker into a sequence of relocations all at the same offset. Typically, it can be a set of "non-bit" relocations performing some calculation followed by a bit relocation patching the value into the section. The compound relocations allow a number of advantages to be gained. By defining a compound relocation for frequently performed calculations to encode symbols into instructions, object file bloat can be avoided. This can be thought of as a method of file compression. The decompression occurs at link time when the compound relocations are expanded into the full sequence of relocations.

To make use of compound relocations sequences of relocations are manually defined by the programmer as compound relocations identified by a number #n and the generated sequence of relocations is replaced by the corresponding compound relocation in the assembler generated object code module. When the linker encounters an R_COMPOUND relocation, it executes the defined sequence associated with the number #n. This requires each relocation sequence to be defined manually. Such manual programming work is time consuming and increases the possibility of errors being introduced. Furthermore, in the situation where the toolchain manufacturer has developed and used a new sequence of relocations then the end user will not know what the sequence of relocations is and so will be unable to define the required compound relocation without manually examining the assembler generated object code modules. For example, when the toolchain manufacturers has modified the compiler to emit a different assembly language idiom for some particular circumstances this may result in a different sequence of relocations being emitted. e.g. MOV fred+offset, RØ
would yield a different sequence from
MOV offset+fred, RØ
Even though (in this case) the resultant executable code is the same.

When such changes are made it is desirable to have a method of reliably changing the sequence definitions used to give good compression.

It is an aim of the present invention to provide improved assembler functionality to reduce the manual programming work required and to allow an end user to use compound relocations more easily.

SUMMARY OF THE INVENTION

According to embodiments of the present invention there is provided a method of assembling a source code module to form an object code module, said source code module including one or more assembler directives, wherein the assembler directives are used to generate relocation instructions in the object code module, the method comprising: reading a plurality of compound relocation sequence definitions stored in a memory, each compound relocation definition sequence comprising a compound relocation indicator and a first sequence of relocation instructions; reading an assembler directive from said source code module, said directive generating an associated sequence of relocation instructions for executing the directive; determining if said associated sequence of relocations matches one of said stored sequence of relocation instructions; and if a match of relocation sequences is determined, inserting into said object code module a compound relocation including the compound relocation indicator of said matched compound relocation sequence definition instruction and said matched sequence.

Thus, according to the following described embodiments of the present invention, a mechanism is defined for automatically defining and passing compound relocations in object files.

A preferred embodiment of the invention provides a status flag which, when set, implements the method defined above and, when not set, interprets directives conventionally.

According to embodiments of the present invention there is also provided an assembler for assembling an object code module from a source code module comprising program instructions, data and assembler directives that are executable to generate relocation instructions in the object code module, the assembler comprising: a source code reader for reading said program instructions and directives from the source code module; and a directive translator for generating a compound relocation definition instruction in response to said read assembler directive and an associated sequence of relocation instructions, said compound relocation definition instruction defining a compound relocation indicator and the number of instructions in said associated sequence of relocation instructions.

According to embodiments of the present invention there is also provided a method of generating an include source code file for use with the method of claim 6 comprising: inputting one or more special assembler directives to an assembler, each special directive identifying an assembler directive having an associated sequence of relocation instructions for which it is desired to generate a compound relocation sequence definition; in response to one of said special directives, generating a compound relocation sequence definition comprising a compound relocation indicator and said associated sequence of relocation instructions; outputting said generated compound relocation sequence definition from said assembler to a special object code module; inputting said special object code module to a lister, said lister converting said compound relocation sequence definitions to linker insert instructions and outputting said linker insert instructions to generate said include source code module.

According to embodiments of the present invention there is also provided a toolchain for forming a target executable program from a plurality of source code modules, each source code module comprising program instructions or data and assembler directives, the toolchain comprising: an include source code module comprising a plurality of compound relocation definition instructions, each compound relocation definition sequence comprising a compound relocation indicator and a first sequence of relocation instructions; an assembler for assembling said plurality of source code modules and said include source code module to form a plurality of object code modules; and a linker for linking said object code modules to form the target executable program.

For a better understanding of the present invention and to show how the same may be carried into effect, reference will now be made by way of example to the accompanying drawings.

DESCRIPTION OF THE PREFERRED EMBODIMENTS

Figure 1:
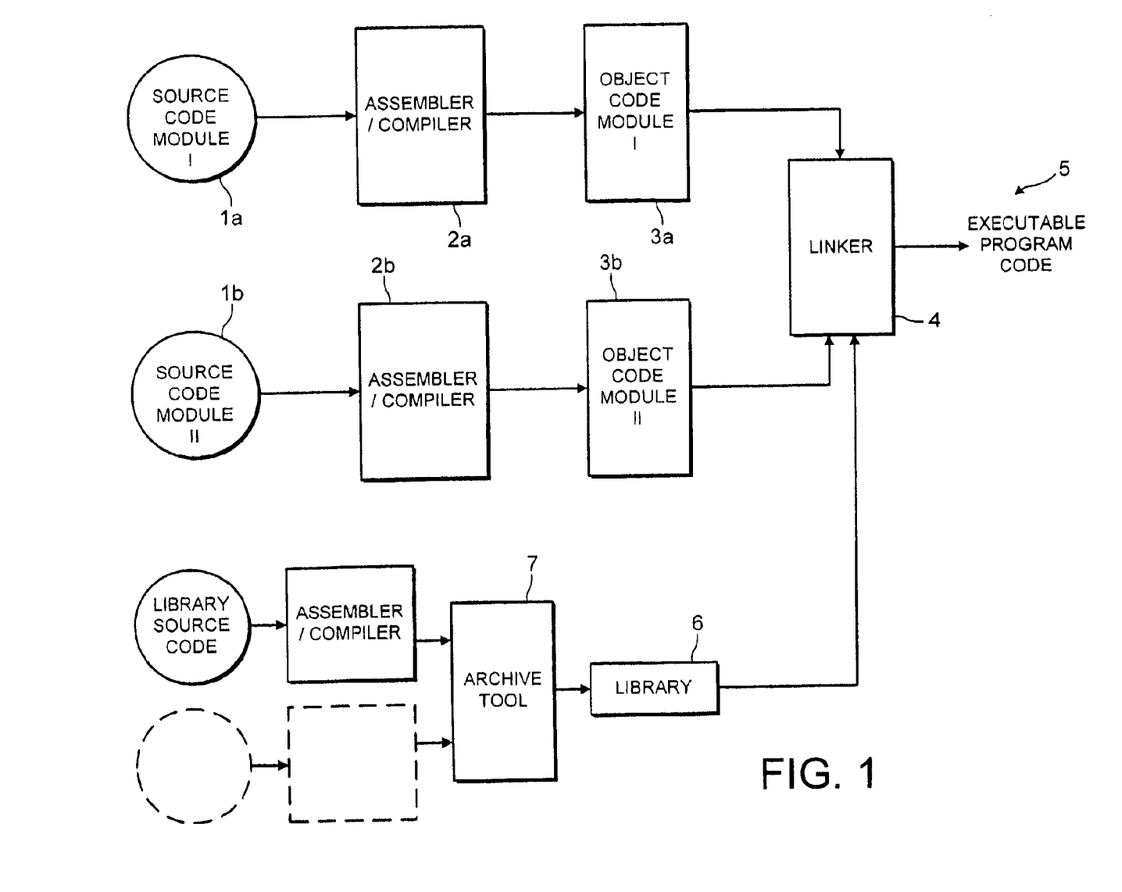
FIG. 1 is a block diagram illustrating the context of the invention.

With reference to FIG. 1, a system for linking a number of program modules to form a single executable program is shown schematically. A number of program source code modules 1a, 1b, each module written in a high level language, is provided. The particular high level language used for each source code module may vary from module to module, or alternatively all of the program source code modules may be written in the same high-level language. Source code modules contain program instructions or data and assembler directives. Each source code module 1a, 1b, is input to a respective assembler/compiler 2a, 2b which assembles and/or compiles the high level language of the source code module to produce an object code module 3a, 3b. Each object code module 3a, 3b is the low level language equivalent to each respective source code module 2a, 2b, the low level language being a language which is directly readable by a target computer into which the final resulting single executable program is to be loaded. It will be appreciated that a single assembler/compiler could be used to sequentially convert a number of source code modules to respective object code modules.

Each object code module 3a, 3b is passed to a linker 4. Object code modules may be stored in libraries, such as the library 6 in FIG. 1, placed under the control of an archive tool 7. Access to these object code modules by the linker 4 is explained later. The linker combines all of the respective object code modules 3a, 3b to produce single executable programs, still in the low level language suitable for the target processor into which the program is to be loaded.

For a given architecture there are often different instruction sequences for achieving the same objective depending on the values of the operands that are being handled. For example, "load a function address into a register" may be achieved in various ways depending on the address in question. When the operand is unknown before link time there is scope for re-writing the code at link time depending on the value of the operand. This re-writing of the code is a form of optimisation termed herein "linker relaxation".

Each assembler generates an object code module including sets of section data, each set of section data having a set of relocations (or relocation instructions) generated by the assembler to describe how the section data is to be patched so as to render it compatible with other section data to form the program 5. The assembler generates these relocations. Section data comprises a plurality of code sequences executable in the final program, and data values to be accessed by the executing program.

Relocations can be ELF standard bit relocations or "non-bit" relocations which are discussed in our earlier Application GB 9920905.8.

It is assumed that a skilled reader is familiar with the ELF format and so only a very brief description will be given hereinafter.

The ELF (executable and linking format) standard defines a convention for naming relocation sections belonging to a given section. For a section of name .xxx the standard prescribes relocation sections .rel.xxx and .rela.xxx. The structure of these sections is defined and a partial semantic associated with them. Specifically an entry in .rel.xxx has, an offset field—the offset in the .xxx section where the patching is to occur, a symbol field—the symbol whose value is to be patched, and a type field—an otherwise undefined type.

It is the type field that is used to describe the appropriate method of encoding the symbol value into the instruction or data of the .xxx section.

The .rela.xxx section is similarly defined but has an extra field (the addend) with the semantic that the addend is to be added to the symbol value before patching in.

In order to support special "non-bit" relocations described in GB 9920905.8, a new type of relocation section is defined, with the naming convention .relo.xxx that is specifically intended to support optimising at link time. In this way the .rel and .rela sections are left free to be used for conventional bit relocations.

Figure 2:
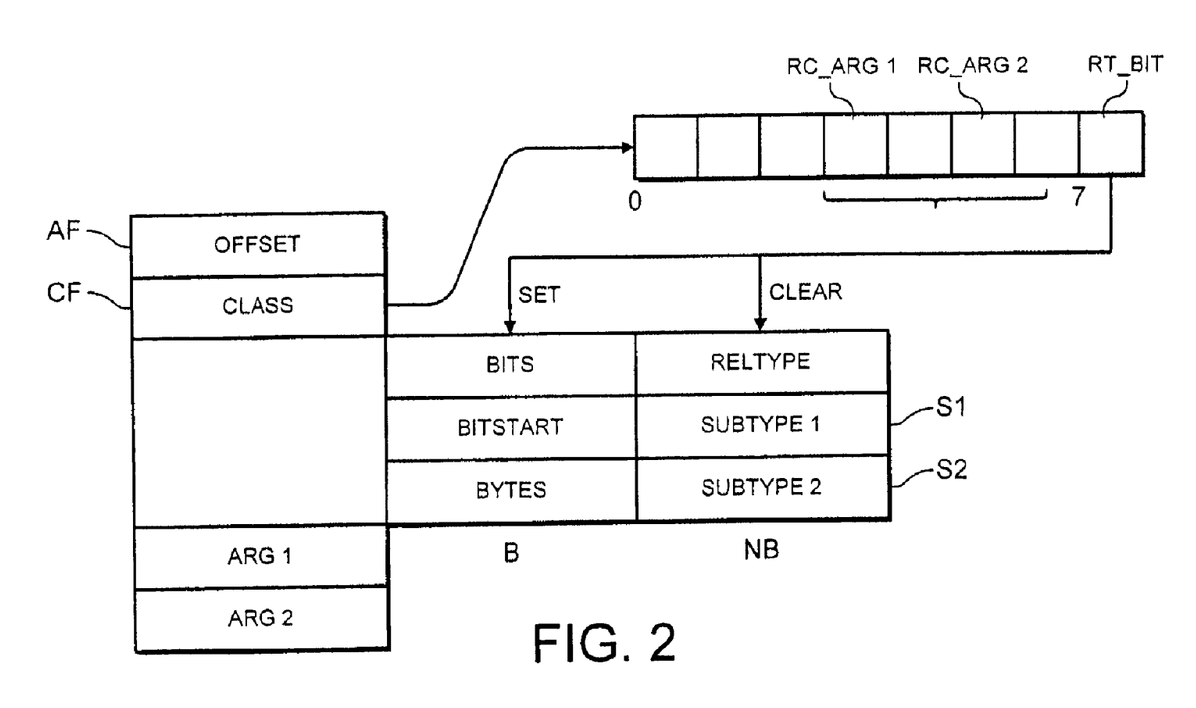
FIG. 2 is a sketch illustrating the layout of the special relocations.

The format of an entry in the .relo section is given in Annexe 1 (it should be read in the context of the 32-bit ELF standard). It is illustrated in FIG. 2.

The underlying structure of the new type has an address field AF (r_offset), a 1 byte classification field CF (r_class), 3 information fields which are labelled reltype, S1, S2 (1 byte each) for non-bit NB relocations and bit, bitstart, bytes for bit (B) relocations, and two one word arguments (r_arg1; r_arg2).

r_offset

The location at which the relocation action is to be applied. (That is, if this is the .relo.xxx section, then r_offset is the offset in the .xxx section where the relocation applies.)

r_class

The classification byte indicates the type of relocation (bit or non-bit), and also conveys information about the use of the remaining fields.

In the classification byte, bit 7 RT_BIT indicates a bit relocation if set (in which case the B fields apply) or non-bit relocation if clear (in which case the NB fields apply). Bits 3–6 specify whether the r_arg1,2 fields are a symbol index or a value. Table 1 defines how the bits specify the interpretation of the r_arg1,2 fields.

r_arg1,2

The interpretation of these fields depends on bits 3–6 of the r_class field. Two bits RC_ARG1, RC_ARG2 are associated with each of r_arg1 and r_arg2. For bit relocations these two fields are normally used as symbol and addend.

For non-bit relocations the fields r_arg1,2 hold constant data being passed with a non-bit relocation. As with bit relocations bits 6 and 5 say whether they hold a symbol index or a value. The actual use of any symbol or value passed with a non-bit relocation depends on the nonbit.reltype field. This may be an absolute value representing things such as alignment, register numbers etc. The semantics are given in the table of relocation types in Annexe 2.

The bit (B) type fields:

r.bit.bits

The number of bits that are to be patched. A lower case "b" is used to indicate this quantity in the name of a relocation.

r.bit.bitstart

The least significant bit to be patched. A lower case "s" is used to indicate this quantity in the name of a relocation.

r.bit.bytes

The size of the object being patched. This is needed for big endian targets in order to find which byte the least significant bit is to be found in, and where the higher order bits are. An upper case "B" is used to indicate this quantity in the name of a relocation.

Note that the following notation is used to name the bit relocations:

R_b<val>s<val>B<val> where <val>'s represent the number of bits, start bit and number of bytes as specified by the r-bits, r.bitstart, r.bytes fields. For example R_b16s0B4 will patch the least significant two bytes of a four-byte object. This will be the bytes at offsets 0,1 or 4,3 depending on the target endianness.

The non-bit (NB) type fields:

r.nonbit.reltype

This field describes what sort of action the linker must perform. These include such things as executing an operation on the linker's internal stack of values, storing parameters to macros, conditionally deleting section data etc, as described in more detail later.

r.nonbit.subtype1,2 (S1,S2)

These fields hold values whose interpretation depends on the reltype field, and bits 3 to 6 of the classification field.

TABLE 1

| Name | RC_ARG1 | Meaning |
|---|---|---|
| RC_PARAM | 3 | r_arg1 is param |
| RC_VAL | 2 | r_arg1 is value |
| RC_SYM | 1 | r_arg1 is symbol |
| RC_UNUSED | 0 | r_arg1 is unused |

Figure 3:
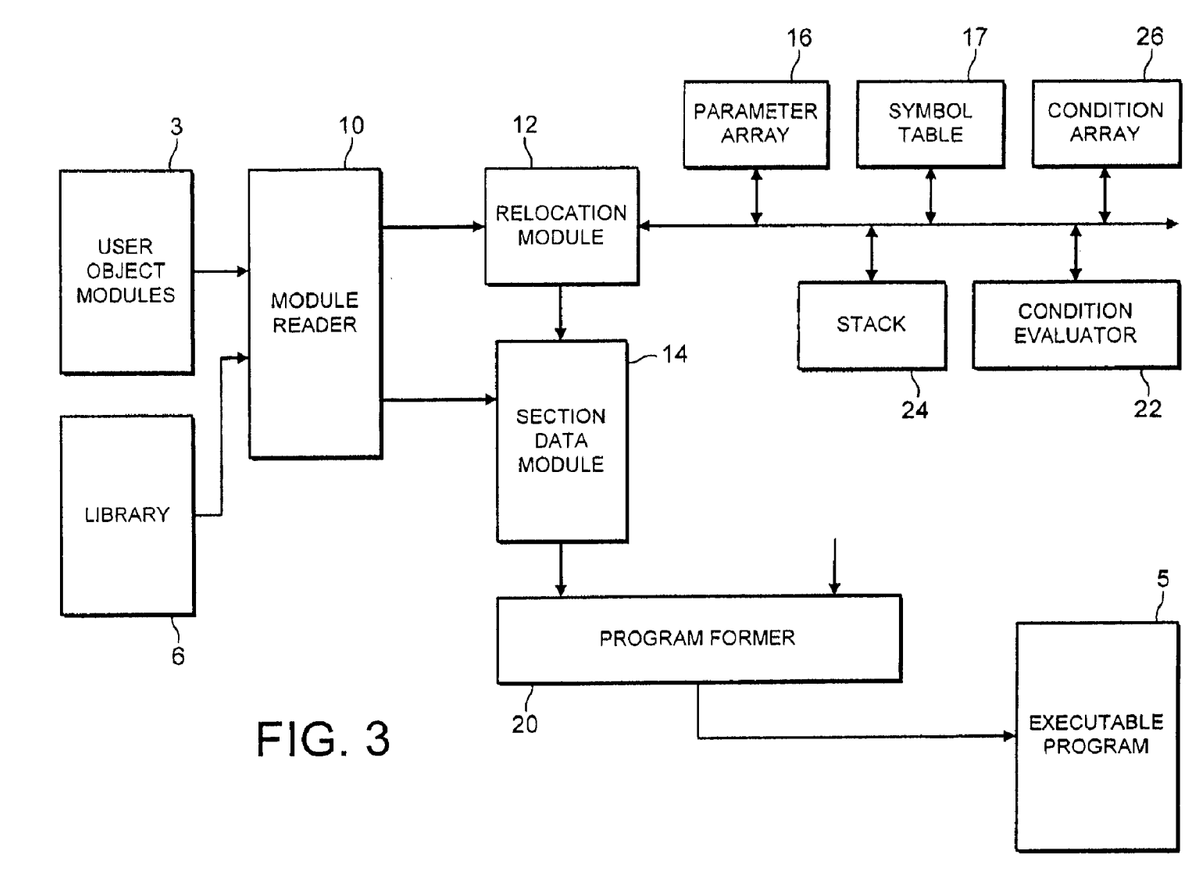
FIG. 3 is a block diagram of a linker.

The above-described type of relocation section .relo.xxx supports a number of special relocations that allow a number of different functions to be performed by the linker. These are discussed in our earlier Application GB 9920905.8. FIG. 3 is a block diagram of components of the linker described herein for the sake of completeness. It will be appreciated that in practice the linker can be constituted by a suitably programmed microprocessor. It will be understood therefore that the schematic blocks shown in FIG. 3 are for the purposes of explaining the functionality of the linker.

The linker comprises a module reader 10 that reads a set of incoming object files as user written code modules and library object files from the library 6. A relocation module 12 reads the relocations in the object code module. A section data module 14 holds section data from the object code module and allows patching to take place in response to relocation instructions in the object code module interpreted by the relocation module 12. The relocation module can also interpret special relocations and apply these to the section data held in the section data module 14. A program former 20 receives sequences from the section data module 14 and/or the library 18 depending on the actions taken by the relocation module 12 and forms the executable program 5 that is output from the linker 4. The linker also includes a condition evaluator 22 that operates in conjunction with a stack-type store 24. The condition evaluator reads the value of the top entry of the stack 24.

The linker also implements three arrays or tables as follows, a parameter array 16, a symbol table 17, and a condition array 26.

The basic operation of forming an executable by a linker is summarised below. The basic operation comprises:
1. Copying sections from input modules to same-name sections in the output executable, and
2. Patching sections following the relocations in their corresponding relocation sections. This can include deleting code sequences from the module and inserting code sequences although these are not discussed further herein.

Figure 4:
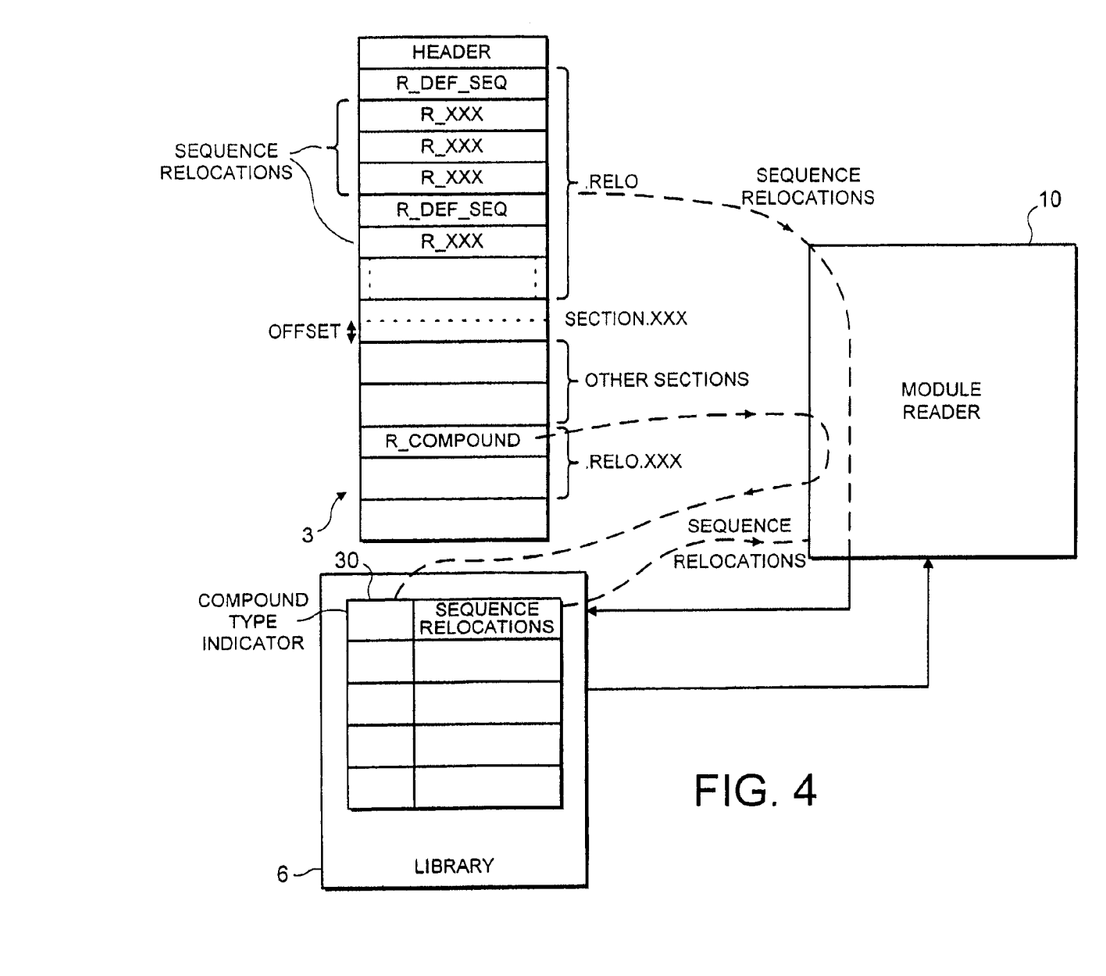
FIG. 4 is a schematic diagram illustrating the use of compound relocations and sequence defining relocations.

Reference will now be made to FIG. 4 to describe a compound relocation and a sequence defining relocation, as described in GB 9925849.3. A compound relocation is a relocation that can be expanded into a sequence of relocations to be implemented all at the same offset in the section data FIG. 4 illustrates one example. The object module 3 is shown as having a separate .relo definition section distinct from the .relo.xxx sections which are associated with specific section data. The separate .relo definition section contains a defining relocation R_DEF_SEQ. The R_DEF_SEQ passes the number of relocations that are to follow (in the subtype 2 field), and the identifying number #n of the compound relocation (in the subtype 1 field). As previously mentioned, the reltype field indicates that it is a defining relocation. The following relocations are labelled in FIG. 4 as the sequence relocations. The values in the r_arg1,2 fields of the defining sequence are reserved and should be set to zero in the sequence definition. The defining relocation R_DEF_SEQ and the following sequence relocations are read by the module reader 10 and are used to set up a table in the library 6 which holds each relocation sequence in association with the compound relocation type. The table is labelled 30 in FIG. 4. As discussed below, different ways of "decoding" the defining relocation R_DEF_SEQ are possible. In the present example, when the table 30 has been set up, it can be read by the module reader 10 to recover a particular relocation sequence whenever a relocation identifying the stored relocation type is encountered later.

When a compound relocation R_COMPOUND is encountered, the r_arg1,2 fields are treated as parameters to the sequence to be expanded (unless they have RC_ARG1,2 set to RC_UNUSED). That is, the sequence of relocations can make use of any symbol or addend passed with the compound relocation by setting RC_ARG1,2 to RC_PARAM (see Table 1). The corresponding r_arg1,2 field in each relocation in the sequence is substituted by parameters held in the r_arg1,2 fields of R_COMPOUND.

That is, an R_COMPOUND relocation may have either, both or none of the r_arg1,2 fields containing a symbol or value. For example, in the following description R_COMPOUND with subtype 1=13 and r_arg1 holding the symbol .L26 expands to the sequences given in Table 1 discussed below by substituting the symbol .L26 into the sequence given in Table 2. Note that in this example the symbol .L26 is substituted only once, in the first relocation of the sequence (R_PUSH). That substitution is triggered by relocation R_PUSH having its r_arg1 field defined as RC_PARAM in the r_class field ELF32_rc_arg1.

However, the symbol defined in the R_COMPOUND relocation could be substituted into several relocations in the sequence, and it would also be possible to substitute a value in the r_arg2 field of the R_COMPOUND relocation into the same field in other relocations in the sequence. This parameterisability is very important for interoperability. A foreign ELF file has only ELF32 rela_relocations, each with a symbol and addend.

These must be substituted into the sequence of ELF32 relo instructions, which implement the encoding operations implicit in the ELF32 rela ad hoc reltype definitions.

Table 1 illustrates an example of a compound relocation definition for an instruction MOVE.L @ (.L26, PC),Rn. The sequence of relocations for defining this as a compound relocation is given in Table 2 and is listed below. The first relocation in the definition sequence defines a compound number (#n=13) by use of the r.nonbit.subtype1 field and defines the number of relocations in the sequence as 10 using the r.nonbit.subtype2 field. There then follows ten relocations of the type discussed earlier.

---

RELOC_DEF_SEQ r.nonbit.subtype1=13, r.nonbit.subtype2=10, RC_ARG1=RC_SYMBOL
RELOC_PUSH RC_ARG1=RC_PARAM, r.nonbit.subtype1=SF_VALUE
RELOC_PC
RELOC_PUSH r_arg2=0xFFFFFFFC, RC_ARG2=RC_VAL
RELOC_AND
RELOC_PUSH r_arg2=4, RC_ARG2=RC_VAL
RELOC_ADD
RELOC_SUB
RELOC_PUSH r_arg2=4, RC_ARG2=RC_VAL
RELOC_DIV
RELOC_b8s0B2

---

The relocation sequence implements (.L26−((PC+0x FFFFFFFC)+4))/4 which is then patched into the bottom eight bits of a 2-byte instruction. Note that all RC_ARGn are RC_UNUSED except where noted.

So far, setting up of the compound relocation and the resulting sequence relocations have been described. In use, when the relocations are read from the relocation section associated with each section of data, .relo.xxx, any relocation identified by the relocation type R_COMPOUND and #n (#n=13 in the specific example) triggers off a certain sequence of relocations as held in the table 30 of FIG. 4. Table 1 illustrates the effect of triggering the relocation sequence defined in Table 2 with RC_ARG1 set to RC_SYMBOL, and r_arg1 containing .L26.

In the above described example, the compound relocation definition is conveyed in the separate section called .relo, the sequence definition is installed at the beginning of the link and remains fixed during the link by virtue of being set into the table 30 in the library 6. Another possibility is to insert the compound relocation definitions into the sections to which they apply. (In this case Table 30 is updated as the R_DEF_SEQs are encountered.)

A third possibility is to define a set of compound relocations prior to link time and compile them in the linker or in the library 6. That is, it would be possible to move the table 30 into the linker itself with predefined reltypes associated with the predefined sequences.

In preferred embodiments of the present invention object code file compression is implemented by providing an additional source code module, referred hereinafter as an include file, that only contains compound relocation sequence definitions for those relocation sequences that have been identified as commonly recurring. The include file is input to the assembler together with the other source code modules and has the effect of 'teaching' the compound relocation sequence definitions to the assembler so that rather than the assembler emitting a sequence of relocations in response to a particular relocation type (assembler directive), it recognizes that the sequence matches a sequence contained in the include file and substitutes a compound relocation into the object code module instead.

Additionally, the compound relocation sequence definitions are output to an object code module that preferably contains only the compound relocation sequence definitions, although the compound relocation sequence definitions may be inserted into the individual object code modules that contain the corresponding compound relocation.

As already mentioned, if the toolchain manufacturer has additionally developed and used relocation sequences which the end user is unfamiliar with it is very difficult for the end user to identify the commonly recurring sequences generated by the assembler in response to the compiler generated assembly source code and to subsequently make use of compound relocations for these sequences. In preferred embodiments of the present invention this difficulty is overcome by the toolchain manufacturer also including compound relocation sequence definitions for these sequences in the include file. The include file is supplied by the toolchain manufacturer together with the other elements of the toolchain i.e. the assembler and linker.

If the end user wishes to make use of file compression as described above, he simply includes this file with the remainder of the source code modules at assembly and stipulates its use by including an assembler directive, INCLUDE, at the beginning of the other source code modules.

It will be appreciated that because it is sequences of assembly code that it is desired to be substituted by a compound relocation in the object code modules, the include file must in fact contain the sequence definitions in assembly code directly readable by the linker, rather than source code language readable by the assembler. The include file therefore contains a series of what are referred to herein as 'Linker inserts'. A linker insert is a directive to the assembler to insert a relocation into the object code module at the current offset.

The general form of the LT_RELOC directive is:

LT_RELOC F_class, reltype, subtype1, subtype2, r_arg1, r_arg2 e.g. LT_RELOC O,R_ADD, 0;0 instructs the assembler to insert and R_ADD relocation with r_class=Ø subtype 1=0 subtype 2=Ø

Although the include file may be generated by hand i.e. by manually writing the series of linker inserts, this is very time consuming and very prone to error. Therefore to overcome this difficulty, in preferred embodiments of the present invention the assembler $2a$, $2b$ has increased functionality over previous assemblers to automatically generate the include file in the following manner.

Figure 5:
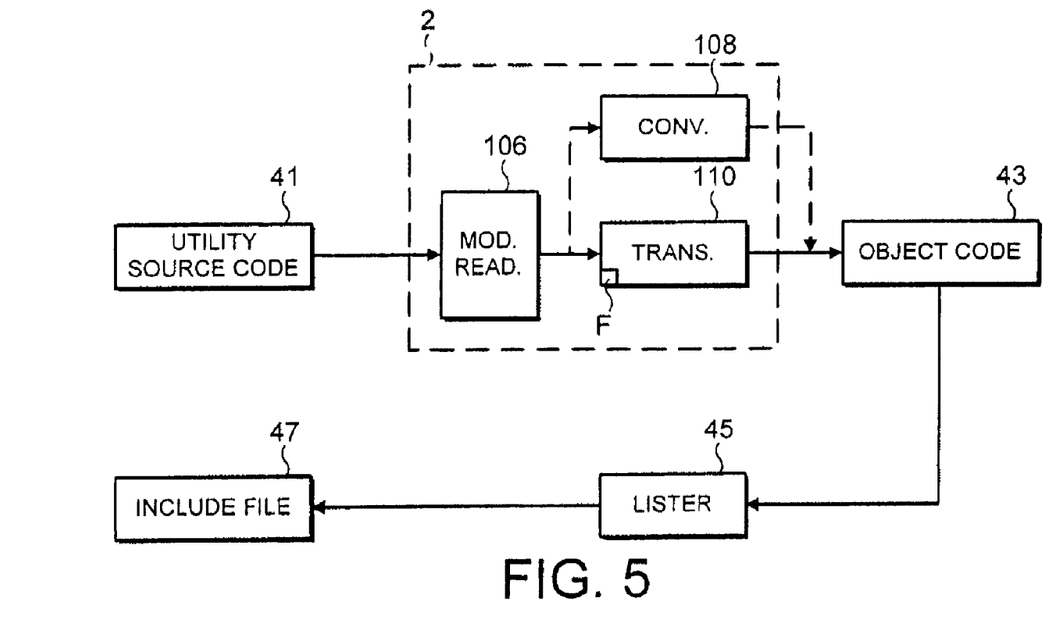
FIG. 5 is a schematic diagram showing the generation of an include file for use in embodiments of the present invention.

FIG. 5 is a block diagram showing how the required include file may be generated according to an embodiment of the present invention. FIG. 5 shows a special source code module 41, referred to hereinafter as the utility source code and explained further below. The utility source code module 41 is input to the assembler 2. The assembler 2 comprises a module reader 106, a code converter 108 and a code translator 110, which has a status flag F. Flag F, when set, allows the assembler to generate compound relocation sequence definitions and to implement object file compression as described herein. When the flag F is not set, the assembler operates in a conventional manner. The module reader 106 reads an input source code module and supplies program code to the code converter 108 and directives to the code translator 110 in a manner known per se. When the assembler is operating in a conventional manner the code converter 108 converts source code to object code to generate section data for the object code module. The code translator 110 translates assembler source code to generate sequences of relocations for the relocation section of the object code module.

The utility source code module contains only special sequence definition assembler directives that are similar to the R_DEF_SEQ directives previously described with respect to compound relocations. One such special assembler directive for each sequence of relocations that is not familiar to the end user and any directive or instruction that has been identified as causing the assembler to generate commonly recurring sequences of relocations is included in the utility source code. As an example consider that a new assembler instruction is 'MOV fred, R0', where fred is a symbol. The corresponding utility source code assembler directives that instructs the assembler to generate the sequence definition are as follows:

LT_RELOC 0x18 R_DEF_SEQ 12 0 fred
MOV fred, R0
LT_RELOC 0 R_NONE 0 0

The assembler interprets the first assembler directive as an instruction to generate a sequence definition for R_COMPOUND number 12. The assembler is able to distinguish that this is not simply the sequence definition itself i.e. a normal R_DEF_SEQ instruction, because the number of instructions in the sequence has been defined as 0, which is normally invalid. The 0x18 term is the value of the r_class that indicates that r_arg1 is a parameter.

Figure 6:
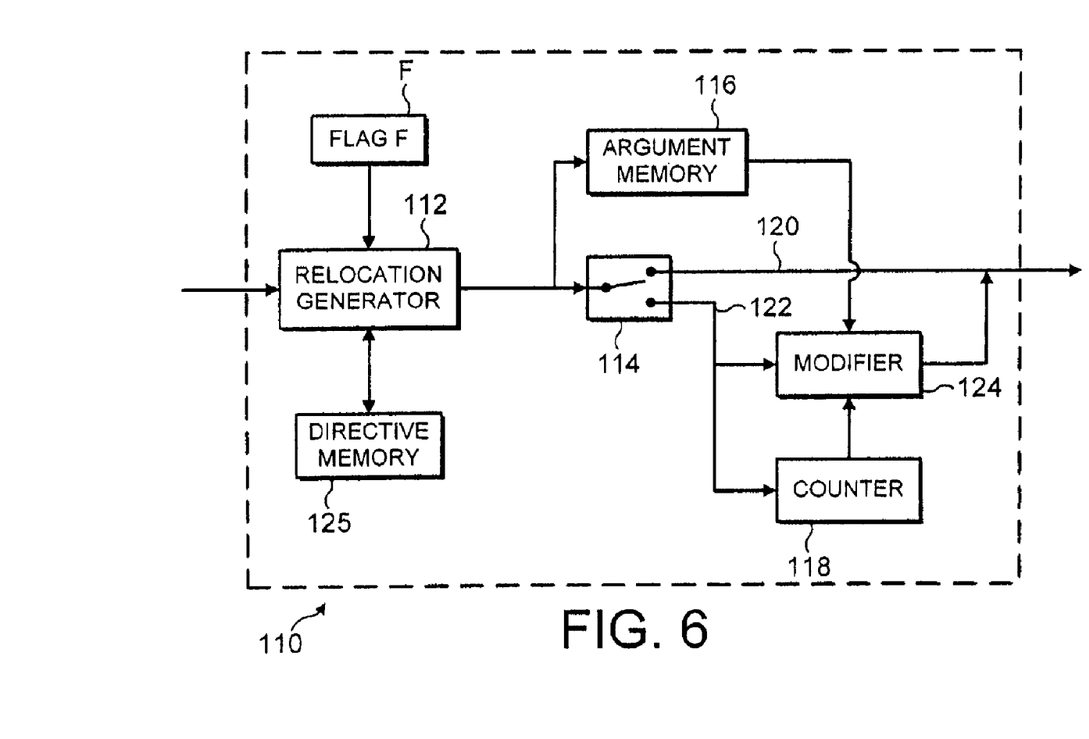
FIG. 6 is a schematic diagram of an assembler for use in embodiments of the present invention.

FIG. 6 is a schematic representation of the components of the Code Translator 110 shown in FIG. 5. When the assembler 2 reads an assembler directive from the utility source code module, it is passed to a relocation generator 112 within the Code Translator 110. The relocation generator 112 receives as an input the status of flag F. The flag F is set when the utility source code module is provided as an input to the assembler. If the flag F is set, the relocation generator 112 issues a R_DEF_SEQ relocation that is output to the object code module 3 via a switching unit 114. The switching unit can switch the output of the relocation generator 112 between two output paths 120, 122 and is responsive to the relocation generator 112 issuing a R_DEF_SEQ relocation such that subsequent to the R_DEF_DEF relocation being issued and output via first output path 120, the switching unit 114 re-routes the output of the relocation generator 112 to the second output path 122. In response to an R_DEF_SEQ relocation being generated by the relocation generator 112 the symbol and/or value specified in the RC_ARG 1,2 fields of the R_DEF_SEQ relocation are stored in a temporary argument memory 116. In the example given previously this is the symbol fred. As previously stated, the value of the subtype 2 field denoting the number of instructions in any sequence is initially set at zero in the R_DEF_SEQ relocation, as the number of relocations to follow is not yet known. The relocation generator 112 then generates the sequence of relocations for the specified instruction on directive e.g. MOV in the known manner to fully define the compound relocation as previously described. As each relocation in the sequence is generated, an instruction counter 118 is incremented. Each relocation is output via a relocation modifier 120 that compares the value and/or symbol passed by each relocation with those held in the temporary memory 116 and if they match modifies the relocation to contain the indicator RC_PARAM. The end of the sequence is denoted by the R-NONE instruction and in response to this the number of relocations counted by counter 118 is inserted into the previously issued R_DEF_SEQ relocation and the counter is reset to zero. Also in response to the R-NONE instruction the switching unit 114 changes to route any subsequent relocations generated by the relocation generator 112 via the first output path 120. The sequence definitions are placed in a special object code module 43 as previously discussed and as shown in FIG. 5.

Referring back to FIG. 5, to generate the required include file 47 the special object code module 43 containing the assembly code sequence definitions is input into a source code generator 45. The source code generator 45 may be thought of as a special kind of lister but in fact it simply converts the assembly compound relocation definition sequences contained in the special object code module into linker inserts by placing a special assembler directive, LT_RELOC, before each relocation placing the linker inserts in a special section of the assembly source code. The assembler directive LT_RELOC has the function of instructing the assembler to insert the relocations into an object code module as discussed above.

By automatically generating the include file 47 no manual generation of the sequence definitions is required which is advantageous in terms of time and reduced likelihood of errors.

With reference to FIGS. 5 and 6, the code translator 110 also includes a directive memory 126 connected to the relocation generator 112. The module reader 106 is responsive to the receipt of an INCLUDE directive from one of the source code modules and reads the contents of the include file 47. Each compound relocation sequence definition in the include file is read by the module reader 106 and is stored in the directive memory 126 via the relocation generator 112. The relocations stored as linker inserts in the include file are intercepted on output in what can be thought of as the 'teaching' phase, as the assembler now contains a stored list of the sequences of relocations that are to be replaced with compound relocations in the object code modules. It performs this interception because it detects that the linker inserts are in the special section.

The source code modules are then processed and whenever a portion of the assembly is received at the relocation generator 112 that causes the assembler to generate a sequence of relocations that match a compound relocation definition sequence stored in the directive memory 126, the generated sequence of relocations are replaced in the output object code module by the compound relocation defined by the matched compound relocation sequence definition.

Thus the resulting object code files contain compound relocations that are expanded at link time by virtue of the linker referring to the separate object code module containing the sequence definitions and substituting these sequences back into the final target executable.

Alternatively, rather than place the compound relocation sequence definitions in a special object code module, they may be placed in the individual object code modules in a special relocation section, the section containing only compound relocation definitions for those compound relocations that have been used in the particular object code module. However, the extent of file compression possible using this method is not the optimum.

TABLE 1

Arg1,2 classes: S = symbol, V = value and U = unused

| Offset | arg1,2 classes | Reltype | subtype 1 | arg1 | arg2 | top of stack |
|---|---|---|---|---|---|---|
| 0x28 | SU | R_PUSH | SF_VALUE | .L26 | — | addr.L26 |
| 0x28 | UU | R_PC | — | — | — | PC |
| 0x28 | UV | R_PUSH | — | — | 0xFFFFFFFC | 0xFFFFFFFC |
| 0x28 | UU | R_AND | — | — | — | PC&0xFFFFFFFC |
| 0x28 | UU | R_SUB | — | — | — | .L26-PC&0xFFFFFFFC |
| 0x28 | UV | R_PUSH | — | — | 4 | 4 |
| 0x28 | UU | R_SUB | — | — | — | .L26-PC&0xFFFFFFFC-4 |
| 0x28 | UV | R_PUSH | — | — | 2 | 2 |
| 0x28 | UU | R_SHR | — | — | — | 4*(.L26-PC&0xFFFFFFFC-4) |
| 0x28 | UU | R_bu8s0B2 | — | — | — | stack empty |

TABLE 2

Arg1,2 classes: P = parameter, V = value and U = unused

| Offset | arg1,2 classes | reltype | Subtype 1 | Subtype 2 | arg1 | arg2 |
|---|---|---|---|---|---|---|
| — | PU | R_DEF_SEQ | rel type 13 | 10 | — | — |
| — | PU | R_PUSH | SF_Value | — | — | — |
| — | UU | R_PC | — | — | — | — |
| — | UV | R_PUSH | — | — | — | 0xFFFFFFFC |
| — | UU | R_AND | — | — | — | — |
| — | UU | R_SUB | — | — | — | — |
| — | UV | R_PUSH | — | — | — | 4 |
| — | UU | R_SUB | — | — | — | — |
| — | UV | R_PUSH | — | — | — | 2 |
| — | UU | R_SHR | — | — | — | — |
| — | UU | R_bu8s0B2 | — | — | — | — |

Annexe 1

```
typedef struct {
    Elf32_Addr r_offset;
    unsigned char r_class;
    union {
        struct {
            unsigned char bits;
            unsigned char bitstart;
            unsigned char bytes;
        } bit;
        struct {
            unsigned char reltype;
            unsigned char subtype1;
            unsigned char subtype2;
        } nonbit;
    } r;
    Elf32_Word r_arg1;
    ELF32_Word r_arg2;
} Elf32_Relo;
```

Annexe 2

| Relocation Type Name | reltyp | Meaning (C syntax is assumed) |
|---|---|---|
| R_NONE | 1 | No action is performed. |
| R_NOOPTIMISE | 2 | Optimisation will be turned off from r_offset |
| R_OPTIMISE | 3 | Optimisation will be turned on from r_offset |
| R_PROC | 4 | Marks start of PROC. One marker byte is inserted at r_offset |
| R_ENDPROC | 5 | Marks end of PROC |
| R_MAX (signed) | 6 | tos=(arg1>arg2?arg1:arg2) |
| R_OR | 7 | tos=(arg1\|arg2) |
| R_XOR | 8 | tos=(arg1^arg2) |
| R_AND | 9 | tos=(arg1&arg2) |
| R_EQ | 10 | tos=(arg1==arg2) |
| R_NE | 11 | tos=(arg1!=arg2) |
| R_GT | 12 | tos=(arg1>arg2) |
| R_GE | 13 | tos=(arg1>=arg2) |
| R_LT | 14 | tos=(arg1<arg2) |
| R_LE | 15 | tos=(arg1<=arg2) |
| R_SHR | 16 | tos=(arg1>>arg2) note: arithmetic shift |
| R_SHL | 17 | tos=(arg1<<arg2) |
| R_ADD | 18 | tos=(arg1+arg2) |
| R_SUB | 19 | tos=(arg1-arg2) |
| R_MUL | 20 | tos=(arg1*arg2) |
| R_DIV | 21 | tos=(arg2/arg2) note: undefined if arg2==0 |
| R_REM | 22 | tos=(arg1%arg2) note: undefined if arg2==0 |
| R_PC | 23 | tos<-P |
| R_NEG | 24 | tos=-tos |
| R_INV | 25 | tos=~tos |
| R_REL | 26 | tos<-O |
| R_SIZE | 27 | tos<-Sz section size |
| R_PUSH | 28 | tos<-symbol attribute or value. s1 holds flag saying which symbol attribute/value to be pushed. |
| R_DUP | 29 | tos<-tos (duplicates the top of stack) |
| R_IF | 30 | if (!tos) section data is skipped |
| R_IF_FIXED | 31 | Worst case branch (only for .macro). |
| R_ELSE | 32 | see R_IF (not supported in .macro). |
| R_ENDIF | 33 | see R_IF |
| R_START_MACRO | 34 | Informational, for error checking. |
| R_EXIT_MACRO | 35 | Linker stops inserting section data at r_offset |
| R_PUT_PARAM | 36 | s1 holds index, s2 holds type information; the linker associates r_arg with these |
| R_GET_PARAM | 37 | s1 holds index, s2 holds type information; the linker retrieves the value associated with these |
| R_STORE | 38 | s1 holds index; the linker associates the value r_arg with the index for retrieval via R_FETCH |
| R_FETCH | 39 | s1 holds index; the linker retrieves the value associated with the index |
| R_MACRO_CALL | 40 | r_arg 1 is a symbol in .macro section whence to insert section data. One marker byte is present at r_offset. |

Key

| | |
|---|---|
| s1,s2 | Mean the r.nonbit.subtype1,2 field of the relocation. |
| S | Means the sum of r_arg1 and r_arg2 after interpreting them as symbol values or constant values according to RC_ARG1/2. |
| So | The value of symbol's st_other field. |
| O | Means the offset, relative to the base of the containing section, of the relocation entry symbol. |
| P | The absolute address of the relocation entry, r_offset (i.e. the PC). |
| Sz | Means the size of the relocation entry symbol's defining section. |
| tos | Top-of-stack, the value at the top of the internal linker stack. |
| tos <- | Pushes a 32-bit signed value onto the internal linker stack. |
| tos=arg1 op arg 2 | If both RC_ARG1 and RC_ARG2 are RC_UNUSED then both the arguments are assumed to be on the stack (with arg1 pushed first). Otherwise arg1 is S (i.e. the symbol value + addend) and arg2 is tos. The argument(s) on the stack are popped and the operation indicated as op is performed. Finally the result is pushed on the stack. |

What is claimed is:

1. A method of assembling a source code module to form an object code module, said source code module including one or more assembler directives, wherein the assembler directives are used to generate relocation instructions in the object code module, the method comprising:

reading a plurality of compound relocation sequence definitions stored in a memory, each compound relocation definition sequence comprising a compound relocation indicator and a first sequence of relocation instructions;

reading assembler source code from said source code module, said source code generating an associated sequence of relocation instructions for executing the directive;

determining if said associated sequence of relocations matches one of said stored sequence of relocation instructions; and if a match of relocation sequences is determined, inserting into said object code module a compound relocation including the compound relocation indicator of said matched compound relocation sequence definition instruction and said matched sequence.

2. A method according to claim 1, wherein the compound relocation instruction is inserted into at least one relocation section of the object code module associated with a set of section data, said compound relocation instruction defining an offset indicating where in the section data the compound relocation instruction is to be effected at link time.

3. A method according to claim 1, wherein said compound relocation instructions are inserted into relocation sections associated respectively with sets of section data, each compound relocation instruction defining an offset indicating where in the section data the compound relocation instruction is to be effected at link time.

4. A method according to claim 1, wherein the compound relocation definition instruction is inserted into the object code module in a relocation definition section.

5. A method according to claim 1, wherein at least one of the relocation instructions of said sequence of relocations associated with the assembler directive has at least one argument field for holding a parameter and said assembler directive has at least one argument field for holding a parameter, said method further comprising:
copying said parameter held in said argument field of said assembler directive into said argument field of said compound relocation instructions.

6. A method according to claim 1, wherein said compound relocation sequence definition instructions are read from an include source code file in response to a further assembler directive being read by said assembler.

7. A method according to claim 6 further comprising reading the status of an interoperability flag and selectively carrying out the method of any preceding claim or inserting into the object code module said sequence of relocation instructions associated with said assembler directive.

8. A method according to claim 7, wherein said interoperability flag is set by said assembler in response to receiving said further assembler directive.

9. A method of generating an include source code file for use with the method of claim 6 comprising:
inputting one or more special assembler directives to an assembler, each special directive identifying an assembler source code having an associated sequence of relocation instructions for which it is desired to generate a compound relocation sequence definition;
in response to one of said special directives, generating a compound relocation sequence definition comprising a compound relocation indicator and said associated sequence of relocation instructions;
outputting said generated compound relocation sequence definition from said assembler to a special object code module;
inputting said special object code module to a lister, said lister converting said compound relocation sequence definitions to linker insert instructions and outputting said linker insert instructions to generate said include source code module.

10. A method according to claim 9, wherein the step of generating the compound relocation definition instruction comprises:
generating said compound relocation indicator having a field for holding a value denoting the number of relocation instructions in said sequence and setting said field value at zero;
counting the number of relocation instructions in said associated sequence; and
inserting said counted number into said field of the compound relocation indicator.

11. An assembler for assembling an object code module from a source code module comprising program instructions, data and assembler directives, that are executable to generate relocation instructions in the object code module, the assembler comprising:
a source code reader for reading said program instructions and directives from the source code module; and
a directive translator for generating a compound relocation definition instruction in response to said read assembler directive and an associated sequence of relocation instructions said compound relocation definition instruction defining a compound relocation indicator and the number of instructions in said associated sequence of relocation instructions.

12. An assembler according to claim 11 further comprising an interoperability flag and selecting means, said selecting means being responsive to the status of said interoperability flag to select a mode of operation of said assembler wherein in a first mode of operation said directive translator generates said compound relocation definition instruction and in a second mode of operation said directive translator generates only said associated sequence of relocation instructions.

13. An assembler according to claim 11, wherein said directive translator comprises:
a relocation generator for generating said compound relocation definition instruction and said associated sequence of relocation instructions; and
a counter for counting the number of relocation instructions in said associated sequence.

14. An assembler according to any one of claims 11, wherein said source code translator further comprises:
a store for storing at least one parameter held in a respective argument field in said assembler source code; and
a relocation modifier arranged to detect at least one of a symbol or value in at least one of said relocations instructions in said associated sequence of relocation instructions that matches said parameter and to replace said matched symbol or value in said relocation with a reference to said parameter.

15. A toolchain for forming a target executable program from a plurality of source code modules, each source code module comprising program instructions or data and assembler directives, the toolchain comprising:
an include source code module comprising a plurality of compound relocation definition sequences, each compound relocation definition sequence comprising a compound relocation indicator and a sequence of relocation instructions:
an assembler for assembling said plurality of source code modules and said include source code module to form a plurality of object code modules;
means for reading assembler source code from said source code module, said source code generating an associated sequence of relocation instructions for executing the directive;
means for determining if said associated sequence of relocation matches the sequence of relocation instructions; and
if a match of relocation sequences is determined, means for inserting into said object code module a compound relocation instruction including the compound relocation indicator of said matched compound relocation sequence definition instruction and said matched sequence; and
a linker for linking said object code modules to form the target executable program.

* * * * *